(12) United States Patent
Turki et al.

(10) Patent No.: US 7,394,794 B2
(45) Date of Patent: Jul. 1, 2008

(54) TRAFFIC IDENTIFIER FIELD USAGE IN A POLLING FRAME IN A PACKET-BASED WIRELESS NETWORK

(75) Inventors: Khaled Turki, Tunis-Carthage (TN); Matthew B. Shoemake, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1111 days.

(21) Appl. No.: 10/324,160

(22) Filed: Dec. 19, 2002

(65) Prior Publication Data

US 2003/0133428 A1 Jul. 17, 2003

Related U.S. Application Data

(60) Provisional application No. 60/349,555, filed on Jan. 17, 2002.

(51) Int. Cl.
*H04Q 7/24* (2006.01)
*H04J 3/02* (2006.01)

(52) U.S. Cl. ............... 370/338; 370/329; 370/349; 370/449; 370/473; 370/535; 709/225; 709/227; 709/228; 709/229; 709/230

(58) Field of Classification Search ............ 370/329, 370/442, 447, 462, 473, 535, 338; 709/225–230
See application file for complete search history.

(56) References Cited

U.S. PATENT DOCUMENTS 4,586,175 A 4/1986 Bedard et al.

(Continued)

FOREIGN PATENT DOCUMENTS

GB 2 320 848 A 7/1998

(Continued)

OTHER PUBLICATIONS

Ranasinghe, Ravindra S., et al., "Impact of Polling Strategy on Capacity of 802.11 Based Wireless Multimedia LANs," 1999 IEEE 0-7695-0243-Jan. 1999, pp. 96-103.

(Continued)

*Primary Examiner*—Edan Orgad
*Assistant Examiner*—Venkatesh Haliyur
(74) *Attorney, Agent, or Firm*—Steven A. Shaw; W. James Brady; Frederick J. Telecky, Jr.

(57) ABSTRACT

An access point in a wireless network transmits polling frames to node wherein the polling frame includes a traffic identifier (TID) value that corresponds to a particular stream or category of traffic. The polling frame prompts the receiving node to respond with its own data frames that correspond to the TID value. The node receiving the polling frame then responds to the polling frame with its own data frames that correspond to the TID value from the polling frame, if the node has any such frames with which to respond. Other features include the implementation priority levels that dictate which frames a node will transmit in response to the polling frame and a request traffic identifier (RTID) value that specifies whether or not the receiving node is to respond with frames that only correspond to the TID value in the polling frame.

36 Claims, 1 Drawing Sheet

U.S. PATENT DOCUMENTS

| | | | |
|---|---|---|---|
| 5,539,882 A | 7/1996 | Gopal et al. | |
| 5,563,883 A * | 10/1996 | Cheng | 370/449 |
| 5,577,046 A * | 11/1996 | Diachina et al. | 370/252 |
| 5,596,577 A * | 1/1997 | Perreault et al. | 370/449 |
| 5,603,081 A * | 2/1997 | Raith et al. | 455/435.3 |
| 5,633,874 A * | 5/1997 | Diachina et al. | 370/329 |
| 5,694,391 A * | 12/1997 | Diachina et al. | 370/346 |
| 5,701,298 A * | 12/1997 | Diachina et al. | 370/346 |
| 5,778,316 A * | 7/1998 | Persson et al. | 455/434 |
| 6,144,653 A * | 11/2000 | Persson et al. | 370/337 |
| 6,658,011 B1 * | 12/2003 | Sevanto et al. | 370/401 |
| 6,937,566 B1 * | 8/2005 | Forslow | 370/231 |
| 7,180,855 B1 * | 2/2007 | Lin | 370/230 |
| 2002/0122432 A1 * | 9/2002 | Chaskar | 370/466 |
| 2003/0093526 A1 * | 5/2003 | Nandagopalan et al. | 709/225 |
| 2004/0042435 A1 * | 3/2004 | Soomro et al. | 370/338 |

FOREIGN PATENT DOCUMENTS

WO     WO 01/41374 A1     6/2001

OTHER PUBLICATIONS

Alwakeel, Sami S., et al., "DPAP: A Dynamic Polling Based Access Protocol for Wireless Networks," 1998 IEEE 0-7803-4872-Sep. 1998, pp. 1126-1130.

* cited by examiner

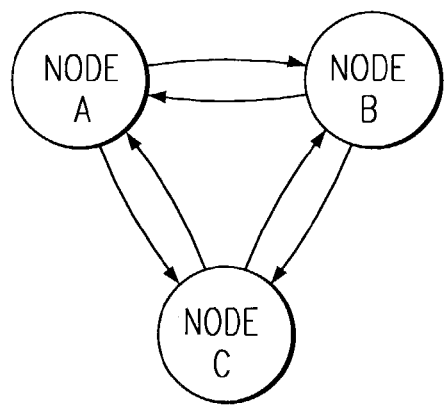
FIG. 1
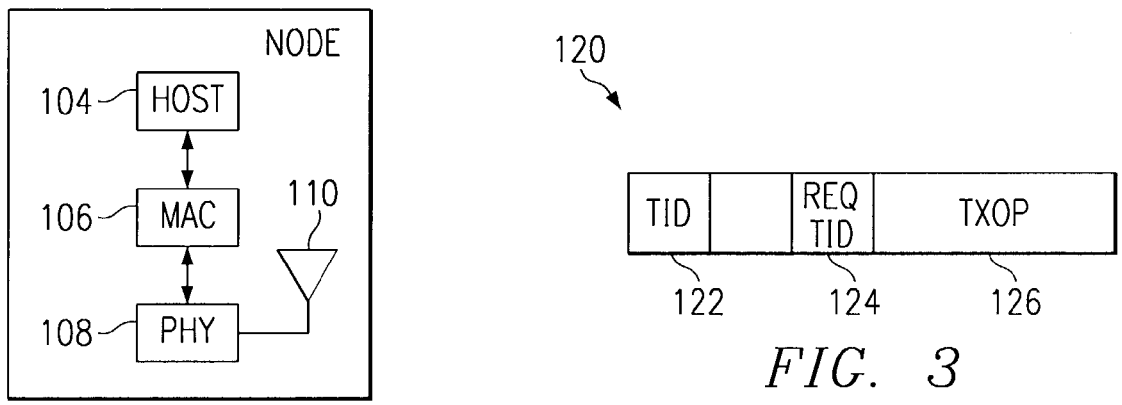
FIG. 2
FIG. 3
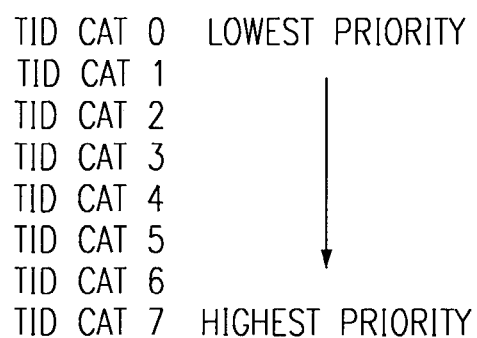
FIG. 4

TRAFFIC IDENTIFIER FIELD USAGE IN A POLLING FRAME IN A PACKET-BASED WIRELESS NETWORK

CROSS-REFERENCE TO RELATED APPLICATIONS

This application is a non-provisional application claiming priority to provisional application Ser. No. 60/349,555, filed on Jan. 17, 2002, entitled "TID Field Usage in QoS CF-Poll," the teachings of which are incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention generally relates to wireless communications. More particularly, the invention relates to an improved control paradigm usable in a packet-based network. Still more particularly, the invention relates to conveying a traffic identifier value in a polling frame to a wireless node that is used by the node when responding to the polling frame.

2. Background Information

Initially, computers were most typically used in a standalone manner. It is now commonplace for computers and other types of electronic devices to communicate with each other over networks. The ability for computers to communicate with one another has lead to the creation of small networks comprising two or three computers to vast networks comprising hundreds or even thousands of computers. Networks can be set up to provide a wide assortment of capabilities. For example, networked computers can be established to permit each computer to share a centralized mass storage device or printer. Further, networks enable electronic mail and numerous other types of services. Networks have been established in a wired configuration in which each entity on the network has a direct physical electrical connection to the network. More recently, advances in wireless technology have made it possible for network devices to communicate with other devices via radio frequency (RF) or other types of wireless media.

In packet-based networks, data and commands are conveyed between nodes on the network in the form of pre-formatted packets (also called frames). In at least some types of packet-based networks, a node desiring to communicate with another node (e.g., to send data to such other node) cannot initiate the transaction. Instead, a central entity on the network (e.g., an access point) queries each node to determine whether any nodes have data to transmit. Upon being queried, a node can access the communication media to transmit its data. As the number of nodes implemented in a network increases, greater pressure is placed on the network to coordinate the use of the medium as efficiently as possible. Any improvement in this area is highly desirable.

BRIEF SUMMARY OF THE PREFERRED EMBODIMENTS OF THE INVENTION

The preferred embodiments of the present invention address the issue raised above by providing a wireless network and associated method in which a node (e.g., an access point) transmits polling frames to another node (e.g., a wireless device) wherein each polling frame includes a traffic identifier (TID) value that corresponds to a particular stream and/or category of traffic. The polling frame prompts the receiving node to respond with its own data frames that correspond to the traffic stream or category specified by the TID value. The node receiving the polling frame then responds to the polling frame with its own data frames that correspond to the TID value from the polling frame, if the node has any such frames with which to respond. In general, the sender of the polling frame can exert some degree of control over the use of the wireless media so as to enable a more efficiently operated wireless network.

Further, the TID value can be encoded with a priority level associated with a traffic category which requests the receiving node to respond with frames that correspond to any traffic category of the same priority level, or alternatively, to the same or higher priority level. In yet another embodiment, the polling frame may include a request traffic identifier (RTID) value that specifies whether or not the receiving node is to respond with frames that only correspond to the TID value in the polling frame. As such, the receiving node can be commanded to respond with data frames that correspond to the TID value of the polling frame if the RTID value is a first value (e.g., logic 1). Alternatively, the receiving node will respond with data frames regardless of whether such frames correspond to the TID value if the RTID value is a second value (e.g., logic 0).

BRIEF DESCRIPTION OF THE DRAWINGS

For a detailed description of the preferred embodiments of the invention, reference will now be made to the accompanying drawings in which:

FIG. 1 shows a wireless network comprising a plurality of nodes;

FIG. 2 shows a preferred embodiment of one such node;

FIG. 3 shows a preferred embodiment of a polling frame which includes a TID value and a request TID value; and FIG. 4 illustrates the use of priority level in accordance with the preferred embodiment of the invention.

NOTATION AND NOMENCLATURE

Certain terms are used throughout the following description and claims to refer to particular system components. As one skilled in the art will appreciate, manufacturers and suppliers of wireless technology may refer to components and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical or wireless connection. Thus, if a first device couples to a second device, that connection may be through a direct electrical connection, or through an indirect electrical or wireless connection via other devices and connections. The term "frame" refers to a basic communication structure which includes overhead information and data information. Unless otherwise stated, the terms "node," "station" and "device" generally refer to wireless stations (WSTAs) and access points (APs). To the extent that any term is not specially defined in this specification, the intent is that the term is to be given its plain and ordinary meaning.

DETAILED DESCRIPTION OF THE PREFERRED EMBODIMENTS

Referring now to FIG. 1, a packet-based network is shown comprising three nodes A, B, and C, although any number of nodes can be implemented in accordance with the preferred embodiment. The nodes preferably communicate with one another through a communication medium which may be wireless or wired-based. Thus, although the following discussion is presented in the context of a wireless network, the present disclosure is not so limited.

In the context of a wireless network, each node may comprise a wireless device. FIG. 2 shows an exemplary embodiment of a node as a wireless device. The node comprises host logic 104 (e.g., notebook computer, handheld computer, PDA, etc.) which communicates with another node via a wireless medium using a MAC sublayer 106 and a PHY layer 108. The MAC sublayer 106 provides a variety of functions and services to facilitate effective wireless communications between stations. Examples of such services include data frame transmission and reception, security, and others. The host 104 uses these services to effectuate communications across the wireless medium 112. The PHY layer 108 provides an interface between the MAC layer 106 and the wireless medium and, as such, couples to one or more antennas 110. MAC and PHY layers are well known in the art. A node may either be configured as an access point which provides an interface to a distribution system comprising routers, servers, storage device and the like, or as a client device which access the distribution system via the access points.

In accordance with the preferred embodiment of the invention, the network implements traffic categories (TC) and traffic streams (TS). A traffic category is a set of service data units with a distinct user priority, as viewed by higher-layer entities, relative to other service data units provided for delivery over the same communication link. A traffic stream is a set of service data units corresponding to a particular application. Traffic from multiple applications (e.g., voiceover-IP, streaming video, email, etc.) can be associated with a single traffic category, while a traffic stream includes traffic from a single application. The preferred embodiment also implements a "traffic identifier" (TID). A TID is a value that indicates a traffic category or a traffic stream. The TID value is included in a field in a communication frame and, in accordance with conventional TID usage, indicates the traffic category or traffic stream associated with payload of the frame being communicated. In one embodiment, the TID value may be implemented as a four bit number which provides 16 possible values. Eight of the values may be assigned as traffic categories and the other eight as traffic streams. The traffic stream and traffic category each may be in the range of 0 through 7 (i.e., TID TS 0-7 and TID TC 0-7).

In accordance with a preferred embodiment, a node (e.g., an access point) transmits a control frame to another node in the network and the frame preferably includes a TID value that is used differently than its conventional usage. The TID value is used as mechanism by which the access point can limit the types and quantity of frames that the receiving node will send in response to the control frame. The control frame preferably is a polling frame by which the sending node provides the receiving node a transmit opportunity (TXOP) to send frames of its own during a given time period. The time period may be encoded as part of the polling frame itself. An exemplary embodiment of a polling frame is shown in FIG. 3 in which frame 120 includes a plurality of fields of information. Field 122 includes a TID value, while field 126 includes a TXOP value which is indicative of the amount of time (encoded, for example, in units of microseconds) during which the node receiving the frame has to use the communication medium to transmit its own frames. Frame 120 may also include a request TID (RTID) field 124 which will be discussed in detail below. Other fields of information (e.g., source and destination addresses) may be included in the frame, but have been omitted for sake of clarity in understanding the preferred embodiment of the invention.

The TID value 122 in the polling frame 120 permits the sending node to control how the receiving node is to respond to the polling request. More specifically, the TID value in the polling frame specifies to the receiving node that only traffic associated with that TID should be transmitted in response to the polling request. This gives the sending poll a degree of control over the network's behavior that is not possible in conventional networks. This control permits the sending node to more efficiently use the network and exert tighter control over the network.

For example, some types of traffic are more critical than other types of traffic in terms of latency or other concerns. An example of a traffic type that is generally considered critical is voice data. The preferred embodiment of the invention permits a user to assign voice data to a particular TID category or stream and then poll the receiving node for only data associated with that one category or stream. The receiving node in this example will respond with voice traffic, if it has any to send, and not attempt to transmit other categories of traffic, even if such other traffic exists and is ready to be transmitted.

Referring again to FIG. 3, a preferred embodiment of frame 120 may also include an RTID field 124. This field preferably comprises a single bit, although it may be implemented with more than one bit if desired. The RTID value in field 124 specifies whether the sending node is soliciting a particular traffic category or traffic stream, as identified by TID 122, or whether the receiving node is free to respond with traffic in any category or stream it desires. As a single bit implementation, request TID bit 122 may be encoded as a "1" to indicate that only traffic corresponding to the TID is being solicited, or as a "0" to indicate traffic corresponding to any TID can be transmitted. Thus, the RTID value provides an additional degree of control over the network's behavior and efficiency.

In accordance with yet another embodiment of the invention, the traffic categories may be associated with priority levels. FIG. 4 lists eight exemplary TID category values, 0-7, with category 0 being associated with, for example, the lowest priority and category 7 having the highest priority. The remaining categories may have varying levels of priority between 0 and 7 and more than one traffic category can have the same priority level. In this embodiment, the TID value 122 in the polling frame indicates to the receiving node that it should respond with traffic corresponding to traffic categories that are at the same priority level as the category identified by the polling frame's TID value. It should be understood that such comparable priority level categories may be different categories than the category associated with the TID in the polling frame, as long as such categories have the same priority level. Further still, the node receiving the polling frame may respond with traffic corresponding to traffic categories that have the same or higher priority level as the category identified by the polling frame's TID value.

In this priority level-based embodiment, the RTID field may still be included in the polling frame 120 to specify, as described above, whether the node that receives the polling frame should limit its responsive frames to frames of categories at the same, or higher, priority level as the traffic category identified by the TID value. Alternatively, the RTID value may be encoded to specify that the receiving node may respond with frames of any traffic category of its choosing.

The above discussion is meant to be illustrative of the principles and various embodiments of the present invention. Numerous variations and modifications will become apparent to those skilled in the art once the above disclosure is fully appreciated. The RTID value is an option and thus need not be included in the polling frame. Also, although the polling frame has been modified as described above to limit the quantity and types of data frames a node transmits across the network, the scope of this disclosure is not limited just to the use of polling frames. It is intended that the following claims be interpreted to embrace all such variations and modifications.

What is claimed is:

1. A method of coordinating the operation of a network, comprising:
    (a) forming a polling frame to include a traffic identifier (TID) value corresponding to a traffic stream or traffic category and to include a request TID (RTID) value that dictates whether the receiving node is to only transmit data frames corresponding to said TID value or that dictates that the receiving node can transmit data frames regardless of whether such frames correspond to said TID value;
    (b) transmitting the polling frame from a sending node to a receiving node, the polling frame giving the receiving node an opportunity to transmit its own data frames;
    (c) decoding the polling frame to recover said TID value and RTID value; and
    (d) transmitting the data frames by said receiving node in response to the polling frame and the dictates of said RTID.

2. The method of claim 1 wherein said TID value encodes a priority level and (d) includes transmitting only those data frames that have the same priority level as that encoded in the TID value.

3. The method of claim 1 wherein said TID value encodes a priority level and (d) includes transmitting those data frames that have the same or higher priority level as that encoded in the TID value.

4. The method of claim 3 wherein said TID value encodes one of at least three priority levels.

5. The method of claim 1 wherein said RTID value comprises a single bit.

6. A method of coordinating the operation of a transmitting node and a receiving node, comprising:
    (a) forming a polling frame to include a traffic identifier (TID) value corresponding to a traffic stream or traffic category and including a request TID (RTID) value that specifies whether the receiving node is to only transmit data frames corresponding to said TID value or can transmit data frames regardless of whether such frames correspond to said TID value;
    (b) transmitting the polling frame from a sending node to a receiving node, the polling frame giving the receiving node an opportunity to transmit its own data frames; and
    (c) decoding the polling frame to recover said TID value and said RTID value.

7. The method of claim 6 further including:
    (d) transmitting a responsive data frame by said receiving node to said transmitting node in response to said polling frame and corresponding to said TID value if said RTID value specifies that the receiving node is to transmit only responsive data frames that correspond to the TID value in the polling frame.

8. The method of claim 6 further including:
    (d) transmitting a responsive data frame by said receiving node to said transmitting node in response to said polling frame, said responsive data frame not corresponding to said TID value if said RTID value specifies that the receiving node can transmit the responsive data frame regardless of whether it corresponds to said TID value.

9. The method of claim 6 wherein said TID value encodes a priority level and when said RTID value specifies that the receiving node is to only transmit data frames corresponding to said TID value, the method includes:
    (d) transmitting a responsive data frame by said receiving node, said responsive data frame corresponding to a traffic category that has the same priority level as the priority level associated with said TID value.

10. The method of claim 6 wherein said TID value encodes a priority level and when said RTID value specifies that the receiving node is to only transmit data frames corresponding to said TID value, the method includes:
    (d) transmitting a responsive data frame by said receiving node, said responsive data frame corresponding to a traffic category that has the same or higher priority level as the priority level associated with said TID value.

11. A wireless network comprising:
    a plurality of wireless nodes; and
    an access point to which said plurality of wireless nodes wirelessly couple;
    wherein said access point forms a polling frame to include a traffic identifier (TID) value corresponding to a traffic stream or traffic category and to include a request TID (RTID) value that dictates whether the receiving node is to only transmit data frames corresponding to said TID value or that dictates that the receiving node can transmit data frames regardless of whether such frames correspond to said TID value and said access point transmits the polling frame to a node, the polling frame giving the node an opportunity to transmit its own data frames to said access point; and
    wherein said node that receives the polling frame decodes the polling frame to recover said TID value and RTID value; and transmits data frames to said access point in response to the polling frame and the dictates of said RTID.

12. The network of claim 11 wherein said TID value encodes a priority level and said node transmits only those data frames that have the same priority level as that encoded in the TID value.

13. The network of claim 11 wherein said TID value encodes a priority level and said node transmits those data frames that have the same or higher priority level as that encoded in the TID value.

14. The network of claim 13 wherein said TID value encodes one of at least three priority levels.

15. The network of claim 11 wherein said RTID value comprises a single bit.

16. A wireless network comprising:
    a plurality of wireless nodes; and
    an access point to which said plurality of wireless nodes wirelessly couple;
    wherein said access point forms a polling frame to include a traffic identifier (TID) value corresponding to a traffic stream or traffic category and to include a request TID (RTID) value that specifies whether the a node that receives the polling frame is to only transmit data frames corresponding to said TID value or can transmit data frames regardless of whether such data frames correspond to said TID value, transmits the polling frame to a node, the polling frame giving node an opportunity to transmit its own data frames to said access point; and wherein said node that receives the polling frame decodes the polling frame to recover said TID value and RTID values.

17. The network of claim 16 wherein said node transmits a responsive data frame to said access point in response to said polling frame and corresponding to said TID value if said RTID value specifies that the node is to transmit only responsive data frames that correspond to the TID value in the polling frame.

18. The network of claim 16 wherein said node transmits a responsive data frame to said access point in response to said polling frame, said responsive frame not corresponding to said TID value if said RTID value specifies that the node can transmit a data frame regardless of whether it corresponds to said TID value.

19. The network of claim 16 wherein said TID value encodes a priority level and when said RTID value specifies that the node is to only transmit data frames corresponding to said TID value, the node transmits a responsive data frame to said access point, said responsive data frame corresponding to a traffic category that has the same priority level as the priority level associated with said TID value.

20. The network of claim 16 wherein said TID value encodes a priority level and when said RTID value specifies that the node is to only transmit data frames corresponding to said TID value, the node transmits a responsive data frame to said access point, said responsive data frame corresponding to a traffic category that has the same or higher priority level as the priority level associated with said TID value.

21. An access point capable of wirelessly communicating with a wireless node, comprising:
 a host device;
 a medium access control (MAC) sublayer coupled to said host device; and
 a physical layer coupled to said MAC sublayer;
 wherein said MAC sublayer forms a polling frame to include a traffic identifier (TID) value corresponding to a traffic stream or traffic category and to include a request TID (RTID) value that dictates whether a wireless node is to only transmit frames corresponding to said TID value or that dictates that the wireless node can transmit frames regardless of whether such frames correspond to said TID value and said physical layer transmits the polling frame to a wireless node, the polling frame giving the node an opportunity to transmit to said access point its own frames that correspond to said TID value and the dictates of said RTID.

22. The access point of claim 21 wherein said TID value encodes a priority level and said polling frame dictates that a node receiving said polling frame transmits only those frames that have the same priority level as that encoded in the TID value.

23. The access point of claim 21 wherein said TID value encodes a priority level and said polling frame dictates that a node receiving said polling frame transmits only those frames that have the same or higher priority level as that encoded in the TID value.

24. The access point of claim 23 wherein said TID value encodes one of at least three priority levels.

25. An access point capable of wirelessly communicating with a wireless node, comprising:
 a host device;
 a medium access control (MAC) sublayer coupled to said host device; and
 a physical layer coupled to said MAC sublayer;
 wherein said MAC sublayer forms a polling frame to include a traffic identifier (TID) value corresponding to a traffic stream or traffic category and to include a request TID (RTID) value that specifies whether a node that receives the polling frame is to only transmit frames corresponding to said TID value or can transmit frames regardless of whether such frames correspond to said TID value; and
 wherein said physical layer transmits the polling frame to a node, the polling frame giving the node an opportunity to transmit its own frames to said access point in response to the specifications of said RTID value.

26. The access point of claim 25 wherein said TID value encodes a priority level and when said RTID value specifies that the node is to only transmit frames corresponding to said TID value, said polling frame dictates that a node receiving said polling frame transmits only those frame that have the same priority level as the priority level associated with said TID value.

27. The access point of claim 25 wherein said TID value encodes a priority level and when said RTID value specifies that the node is to only transmit frames corresponding to said TID value, said polling frame dictates that a node receiving said polling frame transmits only those frame that have the same or higher priority level as the priority level associated with said TID value.

28. A wireless device capable of wirelessly communicating with an access point, comprising:
 a host device;
 a medium access control (MAC) sublayer coupled to said host device; and
 a physical layer coupled to said MAC sublayer;
 wherein said MAC sublayer receives a control frame via said physical layer from the access point, said control frame including a traffic identifier (TID) value corresponding to a traffic stream or traffic category and a request TID (RTID) value, and said wireless device only transmits frames that corresponding to said TID value in the control frame if said RTID comprises a first value and said wireless device responds to said control frame by forming and transmitting a data frame that correspond to said TID value and said RTID value.

29. The wireless device of claim 28 wherein said TID value encodes a priority level and said control frame dictates that the wireless device only transmit those data frames that have the same priority level as that encoded in the TID value.

30. The wireless device of claim 28 wherein said TID value encodes a priority level and said control frame dictates that the wireless device only transmit those data frames that have the same or higher priority level as that encoded in the TID value.

31. The wireless device of claim 28 wherein said control frame includes a request TID (RTID) value, and said wireless device only transmits frames that corresponding to said TID value in the control frame if said RTID comprises a first value.

32. The wireless device of claim 28 wherein said wireless device transmits frames regardless of whether such frames correspond to said TID value in the control frame if said RTID comprises a second value.

33. The wireless device of claim 28 wherein said control frame is a polling frame.

34. A wireless device capable of wirelessly communicating with an access point, comprising:
 a host device;
 a medium access control (MAC) sublayer coupled to said host device; and
 a physical layer coupled to said MAC sublayer;

wherein said MAC sublayer receives a polling frame via said physical layer from the access point, said control frame including a traffic identifier (TID) value corresponding to a traffic stream or traffic category and including a request TID (RTID) value, and wherein said wireless device responds to said polling frame by forming and transmitting a data frame that have the same or higher priority level as that encoded in the TID value if said RTID value is a first value or by forming and transmitting a data frame regardless of the TID value if the RTID value is a second value.

35. The wireless device of claim 34 wherein said TID value encodes a priority level and said polling frame dictates that the wireless device only transmit those data frames that have the same priority level as that encoded in the TID value if said RTID value is the first value.

36. The wireless device of claim 34 wherein said TID value encodes a priority level and said polling frame dictates that the wireless device only transmit those data frames that have the same or higher priority level as that encoded in the TID value if said RTID value is the first value.

\* \* \* \* \*